(12) United States Patent
Fay et al.

(10) Patent No.: US 8,617,760 B2
(45) Date of Patent: Dec. 31, 2013

(54) LOCALIZED DEACTIVATION OF A MEMBRANE

(75) Inventors: Matthew M. Fay, Fairport, NY (US);
Bebe T. Dobulis, Fairport, NY (US);
Timothy J. Fuller, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1636 days.

(21) Appl. No.: 11/464,252

(22) Filed: Aug. 14, 2006

(65) Prior Publication Data
US 2008/0038612 A1    Feb. 14, 2008

(51) Int. Cl.
*H01M 8/10* (2006.01)
*H01M 4/88* (2006.01)
*C08J 5/22* (2006.01)

(52) U.S. Cl.
USPC ........... 429/465; 429/479; 429/535; 429/400; 521/27; 502/101

(58) Field of Classification Search
None
See application file for complete search history.

(56) References Cited

U.S. PATENT DOCUMENTS

| 6,861,173 | B2 | 3/2005 | Bhaskar et al. | |
| 7,759,017 | B2 * | 7/2010 | Mikhail et al. | 429/512 |

FOREIGN PATENT DOCUMENTS

| JP | 5006773 A | | 1/1993 | |
| JP | 09-199145 | * | 7/1997 | H01M 8/02 |
| JP | H09-199145 | | 7/1997 | |
| JP | 2004-220951 | * | 8/2004 | H01M 8/02 |
| JP | 2004220951 A | | 8/2004 | |
| WO | 2005053071 A1 | | 6/2005 | |
| WO | WO 2006/032894 A2 | * | 3/2006 | H01M 8/02 |
| WO | 2006/032894 | | 8/2006 | |

OTHER PUBLICATIONS

English Translation of Office Action for Japanese Patent Application No. 2007-209536; Dated Apr. 26, 2011; 3 pages.

* cited by examiner

*Primary Examiner* — Barbara Gilliam
*Assistant Examiner* — Angela Martin
(74) *Attorney, Agent, or Firm* — BrooksGroup

(57) ABSTRACT

A method including providing an ion conductive membrane and deactivating a selected region of the membrane.

19 Claims, 2 Drawing Sheets

LOCALIZED DEACTIVATION OF A MEMBRANE

TECHNICAL FIELD

The field to which the disclosure generally relates includes ion conductive membranes, products made therefrom, and methods of making and using the same.

BACKGROUND

Fuel cells typically include a membrane such as a polymer electrolyte membrane (PEM), which conducts protons and is sandwiched between a cathode catalyst layer and an anode catalyst layer. Gas diffusion medium (GDM) layers may engage the cathode catalyst layer and the anode catalyst layer, respectively. In some applications, the catalyst layers are coated on the GDM, whereas in other applications, the catalyst layers are coated on the membrane. The membrane, two catalyst layers and two GDM taken collectively are referred hereafter as the Membrane Electrode Assembly (MEA). Disposed outside of the MEA are conductive separator (bipolar) plates for mechanically securing the MEA and electrically connecting adjacent MEAs in series. A portion of each separator plate which is disposed in contact with the MEA is provided with a gas passage for supplying either a fuel such as hydrogen gas or an oxidant such as oxygen gas to the respective electrode surface and for removing generated water. A coolant may also flow through the bipolar plate.

In order to prevent leakage of the hydrogen fuel gas supplied to the anode and oxygen gas supplied to the cathode and prevent mixing of the gases in the fuel cell, heretofore, a gasket is arranged on the periphery of each electrode catalyst layer, with the membrane sandwiched there between. During assembly of the fuel cell, the bipolar plates make contact with the compressible gasket material, thus producing the barrier to gas leakage.

In fuel cells, premature MEA failure has been observed at the catalyst layer edges of MEAs. To protect the catalyst layer edges from premature failure, gasket edge protection materials have been introduced into the MEA architecture. The edge protection materials are either situated between the membrane and each of the respective catalyst layers or between each of the catalyst layers and the respective GDM. The edge protection materials typically cover the membrane outside of the catalyst layer edge. Often, the edge protection materials extend over the inside edge of the catalyst layer edges. However, premature failures were still found in the region of the catalyst edge underneath the edge protection materials.

SUMMARY OF EXEMPLARY EMBODIMENTS OF THE INVENTION

One embodiment of the invention includes a method including deactivating edge regions of an ion conductive membrane. The method includes providing a membrane, deactivating a selected region or regions, particularly the edge regions, of the membrane and assembling the membrane with cathode and anode catalyst layers and gas diffusion medium layers into an MEA. The cathode and anode catalyst layers may be coated on either the membrane or the gas diffusion medium. The method may further include using an edge protection material in combination with the deactivated edge regions of the membrane.

Another embodiment of the invention includes a membrane having a locally deactivated region or regions, particularly edge regions. The edge regions of the membrane are deactivated typically by adding a material, such as barium or another element, to the membrane edge regions to prevent proton conduction. The barium or other element prevents protons from conducting through that region of the membrane, thus deactivating it. Other elements for deactivating regions of the membrane include those which form insoluble sulfate and sulfonate salts including strontium, lead, calcium, silver, and mercury (I). These metals form low solubility products with the sulfonic acid groups of the membrane. The membrane having deactivated edge regions may be used in conjunction with edge protection materials in the MEA. Alternatively, edge protection materials may be omitted from the MEA.

Another embodiment of the invention includes a membrane electrode assembly which includes a membrane having an active region and a deactivated region. A cathode catalyst layer in the membrane electrode assembly has an edge region adjacent to a first surface of the membrane. An anode catalyst layer has an edge region which is adjacent to a second surface of the membrane. The edge region of the cathode catalyst layer and the edge region of the anode catalyst layer are disposed adjacent to the deactivated region of the membrane.

Other exemplary embodiments of the present invention will become apparent from the detailed description provided hereinafter. It should be understood that the detailed description and specific examples, while indicating the exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings.

DETAILED DESCRIPTION OF EXEMPLARY EMBODIMENTS

The following description of embodiment(s) is merely exemplary in nature and is in no way intended to limit the invention, its application, or uses.

Figure 1:
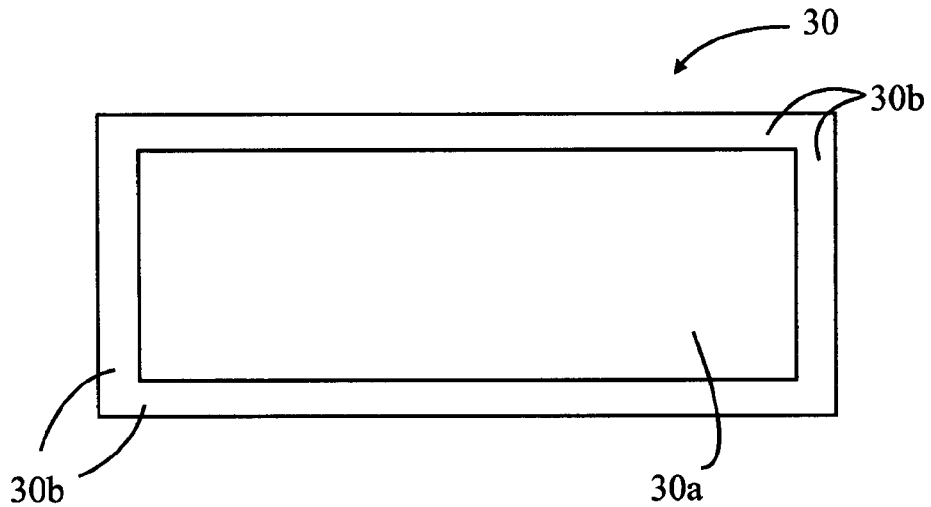
FIG. 1 is a top view of a polymer electrolyte membrane having localized deactivation, according to one embodiment of the invention.

Referring to FIG. 1, one embodiment of the invention includes a membrane 30 including a central, active region 30a (ion conductive) which is capable of conducting protons through that active region 30a of the membrane 30, and a deactivated edge region 30b (non-ion conductive) which surrounds the active region 30a and prevents the conduction of protons through the deactive region 30b of the membrane 30.

Solid polymer electrolyte membranes 30 useful in the present invention are ion-conductive materials. Suitable membranes useful in the present invention are described in U.S. Pat. Nos. 4,272,353 and 3,134,697, and in the Journal of Power Sources, Volume 29 (1990), pages 367-387. Such membranes are also referred to as ion exchange resin membranes. The resins include ionic groups in their polymeric structure; one ionic component for which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. One broad class of cation exchange, proton conductive resins is the so-called sulfonic acid cation exchange resin. In the sulfonic acid membranes, the cation exchange groups are sulfonic acid groups which are attached to the polymer backbone.

The formation of these ion exchange resins into membranes or sheets is well known to those skilled in the art. The preferred type is perfluorinated sulfonic acid polymer electrolyte in which the entire membrane structure has ionic exchange characteristics. These membranes are commercially available, and a typical example of a commercial sulfonic perfluorocarbon, proton conductive membrane is sold by E.I. DuPont de Nemours & Company under the trade designation NAFION. Other such membranes are available from Asahi Glass and Asahi Chemical Company. The use of other types of membrane such as, but not limited to, perfluorinated cation-exchange membranes, hydrocarbon based cation-exchange membranes as well as anion-exchange membranes are also within the scope of the invention. In other alternative embodiments, the membrane may include sulfonated hydrocarbon polymers, including sulfonated polysulfones, polyetheretherketone, polybenzimidazoles, polyimides, polyphenylenes or polyphenylenesulfide.

The deactivated edge region 30b of the membrane body 31 is formed typically by adding a material, such as barium or another element or molecule, in the membrane body 31 along the deactivated edge region 30b. In another embodiment of the invention, the deactivated region 30b is formed by introducing ions that form insoluble sulfate and sulfonate salts, including ions of strontium, lead, calcium, silver, and mercury (I). These metal ions form low solubility products with the sulfonic acid groups of the membrane.

One embodiment of the invention includes preparing a membrane deactivating solution, such as a 0.01 M solution of barium hydroxide ($Ba(OH)_2$), and immersing each edge of the membrane 30 in the membrane deactivating solution, for example, for about 10 minutes. After each immersion, the membrane 30 is removed from the solution and excess solution is removed. In one embodiment of the invention, excess barium ions are washed away from the membrane with water to make certain that electrode catalyst and ionomer contamination does not result. Alternatively, the deactivating solution may be applied to edge regions or other portion or portions of the membrane 30 using a screen printing or other process known by those skilled in the art. In one embodiment of the invention, the ionic conductivity of the deactivated edge region 30b is zero while the ionic conductivity of the active region 30a remains unaffected.

Figure 2:
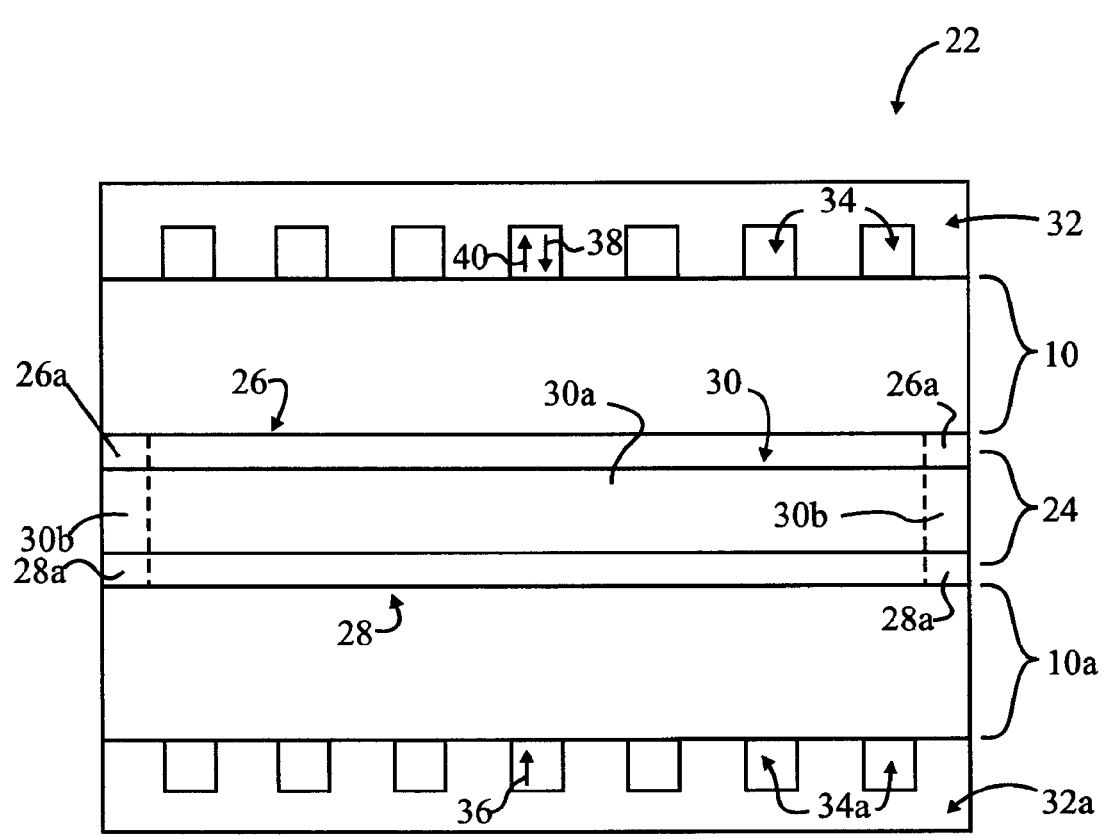
FIG. 2 is a sectional view of a portion of a fuel cell stack, with the membrane with localized deactivation assembled into an MEA in the fuel cell stack, according to one embodiment of the invention.

Referring next to FIG. 2, one embodiment of the invention includes a portion of a fuel cell 22, including a membrane 30 including a deactivated edge region 30b. The membrane 30 is sandwiched between a cathode catalyst layer 26 and an anode catalyst layer 28. A first layer of gas diffusion medium 10 may abut the cathode catalyst layer 26, and a second layer of gas diffusion medium 10a may abut the anode catalyst layer 28. The cathode catalyst layer 26 and the anode catalyst layer 28 may be coated on either the corresponding surface of the membrane 30 or the corresponding gas diffusion medium 10, 10a. An edge region 26a of the cathode catalyst layer 26 and an edge region 28a of the anode catalyst layer 28 are disposed adjacent to the deactivated edge region 30b of the membrane 30. Although not shown, additional edge protection layers, such as disclosed in U.S. Pat. No. 6,861,173 or International Patent Publication No. WO 2006/032894, may be interposed between each gas diffusion medium 10, 10a and the corresponding catalyst layer 26, 28 or between each catalyst layer 26, 28 and the deactivated edge region 30b of the membrane 30. However, in one embodiment of the invention, no edge protection material is present either over or under the catalyst layers 26, A cathode side bipolar plate 32 may abut the gas diffusion medium 10, and an anode side bipolar plate 32a may abut the gas diffusion medium 10a. The cathode side bipolar plate 32 has flow field channels 34 which distribute oxygen 38 to the cathode catalyst layer 26 through the gas diffusion medium 10. The channels 34 also receive product water 40 from the cathode catalyst layer 26 through the gas diffusion medium 10. The anode side bipolar plate 32a has flow field channels 34a which distribute hydrogen gas 36 to the anode catalyst layer 28 through the gas diffusion medium 10a.

During operation of the fuel cell 22, hydrogen gas 36 flows through the channels 34a of the bipolar plate 32a and diffuses through the substrate 10a to the anode catalyst layer 28. In like manner, oxygen 38 flows through the channels 34 of the bipolar plate 32 and diffuses through the gas diffusion medium 10 to the cathode catalyst layer 26. The anode catalyst layer 28 disassociates the hydrogen gas 36 into electrons and protons. The electrons are distributed as electric current from the anode catalyst layer 28, through a load, such as a drive motor (not shown), and then to the cathode catalyst layer 26.

Protons from the hydrogen gas 36 migrate from the anode catalyst layer 28, through the membrane 30 to the cathode catalyst layer 26. At the cathode catalyst layer 26, the protons are combined with electrons returning from the drive motor and oxygen 38 to form water 40. The water 40 diffuses from the cathode catalyst layer 26, through the gas diffusion medium 10 into the channels 34 of the bipolar plate 32 and is discharged from the fuel cell 22. Due to the deactivated edge region 30b of the membrane 30, the protons are conducted or are capable of passing from the anode catalyst layer 28 to the cathode catalyst layer 26 only through the active region 30a and not through the deactivated edge region 30b of the membrane 30.

Figure 3:
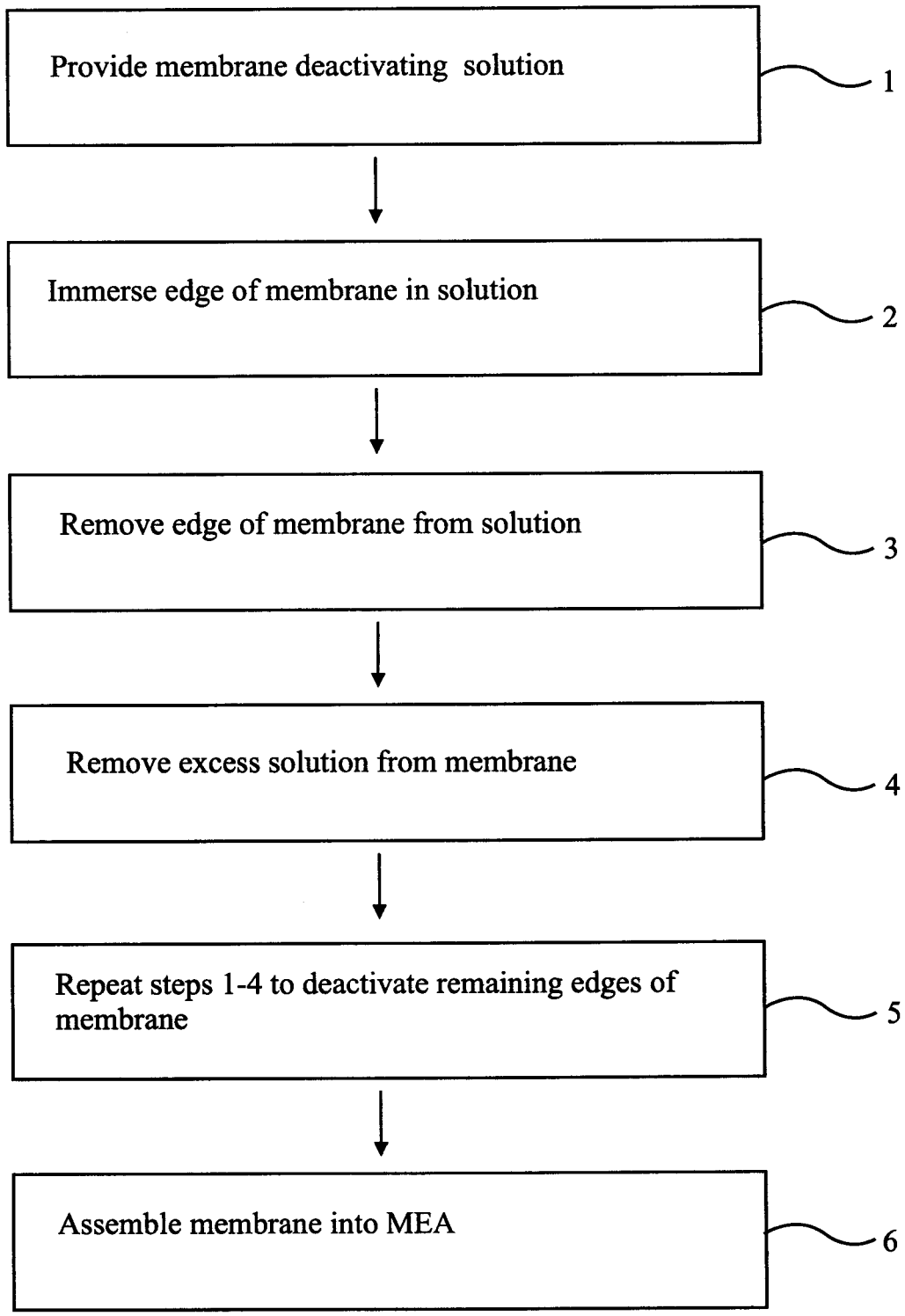
FIG. 3 is a flow diagram for a method according to one embodiment of the invention.

Referring next to the flow diagram of FIG. 3, one embodiment of the invention includes providing a membrane deactivating solution for example, a 0.01 M barium hydroxide solution. Alternative solutions and alternative elements or molecules that are capable of deactivating the ion conductivity of a portion of the membrane contacted with the deactivating solution may be used. A selected region or regions of a membrane is contacted with the deactivating solution for example by immersing the selected region or regions in the membrane deactivating solution for a period of time to add material, such as barium from the solution, in the immersed region or regions of the membrane. In one embodiment of the invention, an edge of the membrane is immersed in the solution for about 10 minutes or less. Thereafter, the membrane is removed from the solution. Once the membrane is removed from the solution, excess membrane deactivating solution is removed from the immersed region or regions of the membrane while preventing contact of the solution with the active region of the membrane. The process is repeated with respect to the remaining edges of the membrane to provide a continuous deactivated edge region on the membrane. The membrane is then optionally washed with water to remove excess metal ions by immersing only those parts of the membrane that were immersed in the metal ion solution. Thereafter, the membrane is assembled into the MEA.

In another embodiment of the invention, the membrane deactivating solution may alternatively be applied to the membrane by any of a variety of methods including, but not limited to, brushing, spraying, pouring, dropping, or screen printing or other method known by those skilled in the art rather than by immersing the membrane portions to be deactivated into the solution. Alternatively, in another embodiment, the portion of the membrane to be deactivated is immersed in water, and barium hydroxide solution is added dropwise until the barium ions are exchanged for the protons of the sulfonic acid groups on the membrane wherein an endpoint is reached where the pH is 7. Other hydroxides of elements other than barium (II) can be used and these include those ions which form insoluble sulfate and sulfonate salts including strontium, lead, calcium, silver, and mercury (I). These metals form low solubility products with the sulfonic acid groups of the membrane.

The above description of embodiments of the invention is merely exemplary in nature and, thus, variations thereof are not to be regarded as a departure from the spirit and scope of the invention.

What is claimed is:

1. A method comprising:
providing an ion conductive membrane comprising a polymer electrolyte and having a body;
deactivating an edge region by introducing at least one metal ion that forms insoluble sulfate and sultanate salts to said membrane extending through the thickness of the body and extending into the body thereof so that the edge region is not ion conductive, wherein the membrane includes a central active region which is ion conducting through the active region of the membrane, and said deactivated edge region which is not ion conducting surrounds the active region and prevents the conduction of ions through the deactivated region of the membrane.

2. A method as set forth in claim wherein said membrane comprises a proton conductive polymer electrolyte membrane.

3. A method as set forth in claim 1 wherein said deactivating an edge region of said membrane comprises adding a material to the edge region of the membrane that prevents proton conduction in the edge region.

4. A method as set forth in claim 3 wherein said material comprises an on of at least one of barium, strontium, lead, silver or mercury.

5. A method as set forth in claim 3 wherein said adding a material comprises providing a deactivating solution and applying said deactivating solution to said edge region of said membrane using a screen printing process, wherein the solution comprising an ion of at least one of barium, strontium, lead, silver or mercury.

6. A method as set forth in claim 5 wherein said deactivating solution comprises a 0.01 M barium hydroxide solution.

7. A method as set forth in claim 4 further comprising coating a cathode catalyst layer on a first surface of said membrane and coating an anode catalyst layer on a second surface of said membrane.

8. A method as set forth in claim 1 further comprising coating a cathode catalyst layer on a first surface of said membrane and coating an anode catalyst layer on a second surface of said membrane.

9. A method as set forth in claim 1 further comprising providing a first gas diffusion medium layer, coating a cathode catalyst layer on said first gas diffusion medium layer, providing a second gas diffusion medium layer, coating an anode catalyst layer on said second gas diffusion medium layer, and placing said membrane against the cathode catalyst layer against a first face of the membrane and placing the anode catalyst layer against a second face of the membrane.

10. A method as set forth in claim 1 further comprising placing an edge protection layer adjacent to one or both of the anode catalyst layer and cathode catalyst layer.

11. A method as set forth in claim 1 wherein the selected region of said membrane extends through the body of the membrane.

12. A membrane for a membrane electrode assembly of a fuel cell, comprising a polymer electrolyte including sulfonic acid groups, said membrane having an ion conductive active central region and an ion non-conductive deactivated edge region, wherein said edge region comprises metal ions that form low solubility products with said sulfonic acid group of said polymer electrolyte to effectively render the edge region ion non-conductive.

13. A membrane as set forth in claim 12 wherein said membrane comprises a protons conductive polymer electrolyte.

14. A membrane as set forth in claim 12 wherein said metal ions comprise at least one of barium, strontium, lead, silver or mercury ion.

15. A membrane as set forth in claim 12 wherein the metal ions comprise barium ion.

16. A method comprising:
providing an ion conductive membrane having a body and at least one edge region; said membrane comprising a polymer electrolyte including sulfonic acid groups;
providing a membrane deactivating solution comprising at least one metal ion that forms a lower solubility product with sulfonic acid groups;
immersing at least one edge region of the membrane in the deactivating solution to allow the metal on to form a low solubility product with the sulfonic acid groups of the polymer electrolyte and to render the at least one edge region ion non-conductive;
removing the at least one edge region of the membrane from the deactivating solution; and
removing any excess deactivating solution that may be left on the at least one edge region of the membrane;
wherein the metal ion comprises at least one of barium, strontium, lead, silver or mercury ion.

17. A method comprising:
providing an ion conductive membrane baying a body;
deactivating a selected region of said membrane extending at least into the body thereof so that the selected region is not ion conductive, the deactivating comprising providing a deactivating solution and immersing said selected region of said membrane in said deactivating solution, wherein the solution comprising a metal ion that forms an insoluble sulfate and sulfonate salt and the metal ion comprises at least one of barium, strontium, lead, silver or mercury ion.

18. A method as set forth in claim 17 wherein said deactivating solution comprises at least one of a barium hydroxide solution or a hydroxide solution of metal ions, the metal ions comprising at least one of an ion of strontium, lead, calcium, silver, or mercury.

19. A method as set forth in claim 18 wherein the membrane includes sulfonic acid groups including a conductive proton and said immersing said selected region of said membrane in said deactivating solution is continued until the protons of the sulfonic groups in the selected region are exchanged with said barium or metal ions.

* * * * *